Figure 2:
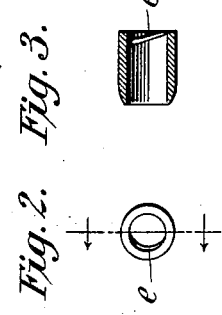

No. 676,505. Patented June 18, 1901.
F. W. & G. J. KITTLINGER.
SHOE TREE.
(Application filed Oct. 24, 1900.)
(No Model.)
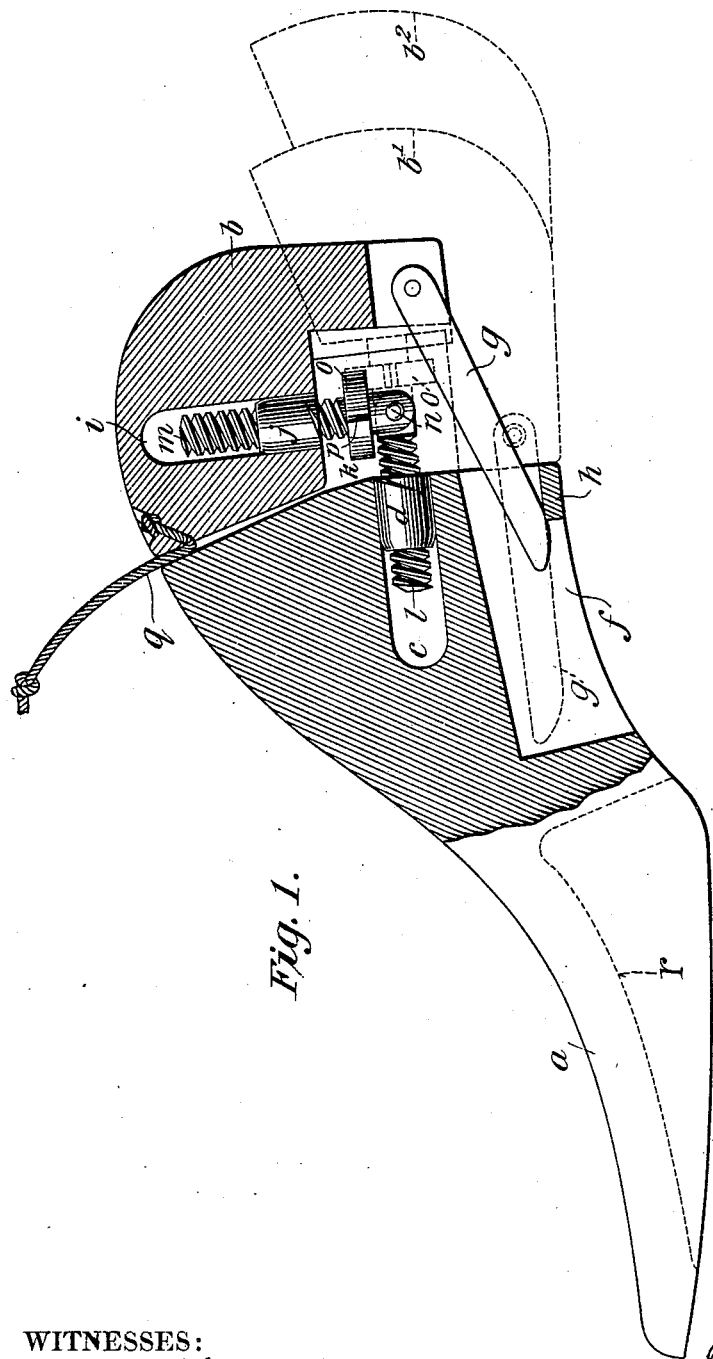
Fig. 1.
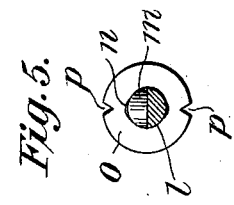
Fig. 5.
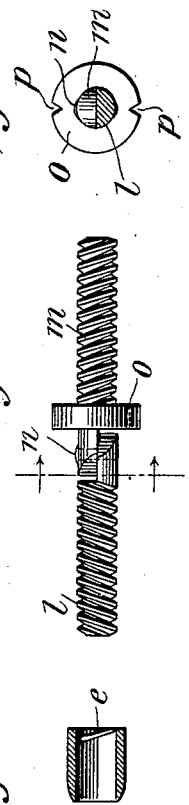
Fig. 4.
Fig. 3.

WITNESSES:
C. E. Ashley
Geo. C. Henning
INVENTORS
G. J. & F. W. Kittlinger,
By their Attorney,
Richard V. Barkley.

United States Patent Office.

FREDERICK W. KITTLINGER AND GEORGE J. KITTLINGER, OF BROOKLYN, NEW YORK.

SHOE-TREE.

SPECIFICATION forming part of Letters Patent No. 676,505, dated June 18, 1901.

Application filed October 24, 1900. Serial No. 34,129. (No model.)

*To all whom it may concern:*

Be it known that we, FREDERICK W. KITTLINGER and GEORGE J. KITTLINGER, citizens of the United States, and residents of Brooklyn, in the county of Kings and State of New York, have invented a certain new and useful Improvement in Shoe-Trees, of which the following is a specification.

The main object of the present invention is the provision of a simple and efficient means for filling or stretching shoes whereby manufacturers may send the shoes out with fillers or trees therein, which trees may afterward be used by the consumer for keeping the shoes in shape.

One advantage of the tree forming the present invention is that each tree may be used with shoes of different "sizes."

The invention consists in features of construction, parts, improvements, and combinations, which will be described hereinafter and more particularly pointed out in the claims concluding this specification.

The preferred form of the invention is illustrated in the accompanying drawings, forming part hereof, in which—

Figure 1 is a side view, partly in section, of a tree in which the invention is embodied. Figs. 2, 3, 4, and 5 are detail views of parts shown in Fig. 1.

The tree or form includes toe and heel sections $a\ b$, which are united in such wise that in the preferred form they may be collapsed for insertion and withdrawal and may also be locked against such collapsing when within the shoe.

In the drawings, $c$ is a recess in section $a$, into which a metal nut $d$ is forced and held by friction. Preferably the nut $d$ has its metal forced inwardly, as at $e$, to form an internal fin or segment of a screw-thread. Section $a$ is also recessed at $f$ to form a guideway for the guide-arm $g$, which is hinged to section $b$, a cross-piece $h$ preventing the disengagement of the arm $g$ from the guideway $f$. The guides $f\ g$ prevent rotation of either section $a\ b$ about the axis of the tree or a line parallel, or substantially so, thereto. Section $b$ is recessed at $i$ to receive a nut $j$, similar to nut $d$, and at $k$ section $b$ is cut away clear across to provide space for the fingers when operating the means for causing relative motion of sections $a\ b$ in the direction of the axis of the tree and to permit the section $b$ to be thrown up to the position thereof shown in full lines in Fig. 1.

Two screws $l\ m$ are connected by a hinge or pin $n$ in such wise that they may have motion in one plane about said pin and are locked thereby against motion in any other plane. Screws $l\ m$ are right and left or reverse screws, and one of them has a disk $o$, fast thereto, whereby the two screws may be rotated to work in nuts $d\ j$ to force sections $a\ b$ away from or toward each other. The notches $p$ in the periphery of disk $o$ indicate whether the pin $n$ is in position such that the section $b$ can be turned to the position thereof shown in full lines in Fig. 1 or is in the position shown in Fig. 4, in which latter case the section $b$ is locked against any but slight motion about the hinge, there being some play usually at the pin.

A string $q$ or other means may be attached to section $b$ to provide means for drawing that section up to the position shown in Fig. 1 when it is desired to remove the tree from the shoe. The toe-section may be hollowed out underneath, as indicated by the reference-letter $r$, to secure greater lightness of the tree.

In the use of this invention the section $b$ is turned to the position thereof shown in full lines in Fig. 1, the screws $l\ m$ having been manipulated previously to draw sections $a\ b$ together, and the tree is then inserted in the shoe, after which section $b$ is turned to position $b'$, and then the double screw is rotated by means of disk $o$ to move the sections $a\ b$ apart until they bear firmly against the toe and heel sections, as in position $b^2$. By leaving pin $n$ vertical after placing the tree in the shoe a lock is provided, which prevents the sections $a\ b$ from getting out of alinement with each other. It is obvious that one and the same tree may be used with shoes of different sizes within the limits of motion of the sections toward and from each other. Screws $l\ m$ may engage nuts formed integrally with the wood of the sections $a\ b$ without departing from the claims herein.

What is claimed as new is—

1. A shoe-tree comprising independent heel and toe sections, reverse-screws hinged together and engaging said sections, and means for preventing the sections from turning independently on said screws, substantially as described.

2. A shoe-tree comprising independent heel and toe sections, reverse-screws hinged together and engaging with said sections, and a bar or rod hinged to the heel-section and slidable in a slot in the toe-section, substantially as described.

3. A shoe-tree comprising independent heel and toe sections, reverse-screws hinged together and engaging with said sections, and an indicator on one of said screws for showing the position of the hinge, substantially as described.

4. A shoe-tree comprising independent heel and toe sections, means for causing motion of said sections toward and from each other, said means being provided with a hinge, whereby the sections may be turned about a transverse axis, and means for preventing relative motion of the sections on any transverse axis except a horizontal one, substantially as described.

5. A shoe-tree comprising independent heel and toe sections, and a hinged connection between said sections, said hinged connection being screw-threaded and arranged to be rotated about an axis substantially parallel with the longitudinal axis of the tree, substantially as described.

6. A shoe-tree comprising independent heel and toe sections, a hinged screw-threaded connection between said sections, said hinged connection being arranged to be rotated about an axis substantially parallel with the longitudinal axis of the tree, and means for preventing said sections from turning independently about the said axis of the tree, substantially as described.

7. A shoe-tree comprising independent heel and toe sections, reverse-screws hinged together and engaging with said sections, and a handpiece on one of said screws, whereby the screws may be turned when the tree is in place in a shoe or boot, substantially as described.

Signed at New York, in the county of New York and State of New York, this 23d day of October, A. D. 1900.

FREDERICK W. KITTLINGER.
    GEORGE J. KITTLINGER.

Witnesses:
    RICHARD W. BARKLEY,
    GUS. C. HENNING.